US006295385B1

(12) United States Patent
Takaoka et al.

(10) Patent No.: US 6,295,385 B1
(45) Date of Patent: Sep. 25, 2001

(54) IMAGE PROCESSING APPARATUS AND IMAGE PROCESSING METHOD

(75) Inventors: Makoto Takaoka, Yokohama; Akinobu Nishikata, Mishima, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/110,022

(22) Filed: Jul. 2, 1998

(30) Foreign Application Priority Data

Jul. 3, 1997 (JP) .................................................. 9-178629

(51) Int. Cl.[7] ...................................................... G06T 3/60
(52) U.S. Cl. ............................................ 382/289; 382/296
(58) Field of Search .................................... 358/452, 474, 358/537; 382/286–292, 296, 162, 165

(56) References Cited

U.S. PATENT DOCUMENTS 5,276,742 * 1/1994 Dasari et al. .......................... 382/46
5,638,181 * 6/1997 Kubo et al. .......................... 358/296
5,761,070 * 6/1998 Conners et al. ...................... 382/165
5,875,035 * 2/1999 Motosugi et al. ................... 358/296
6,011,877 * 1/2000 Ishikawa et al. .................... 382/290

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

An image processor performs a high accuracy orientation determination process on a color image. A color component analyzer determines a frequency of appearance of each color component based on color image data of an input original document, and an orientation determining block determines the orientation of the original document by a character recognition process based on the frequency of appearance result. The color image data is then subjected to a predetermined editing in accordance with the determination results, and the edited image data is output.

12 Claims, 12 Drawing Sheets

2-in-1

2-in-1 on both sides 4-in-1

4-in-1 on both sides 8-in-1

8-in-1 on both sides 9-in-1

9-in-1 on both sides

LATERAL WRITING
WITH CHARACTERS
IN UPRIGHT POSITION

VERTICAL WRITING
WITH CHARACTERS
IN UPRIGHT POSITION

LATERAL WRITING
WITH CHARACTERS
IN HORIZONTAL POSITION

VERTICAL WRITING
WITH CHARACTERS
IN HORIZONTAL POSITION

FIG. 9A
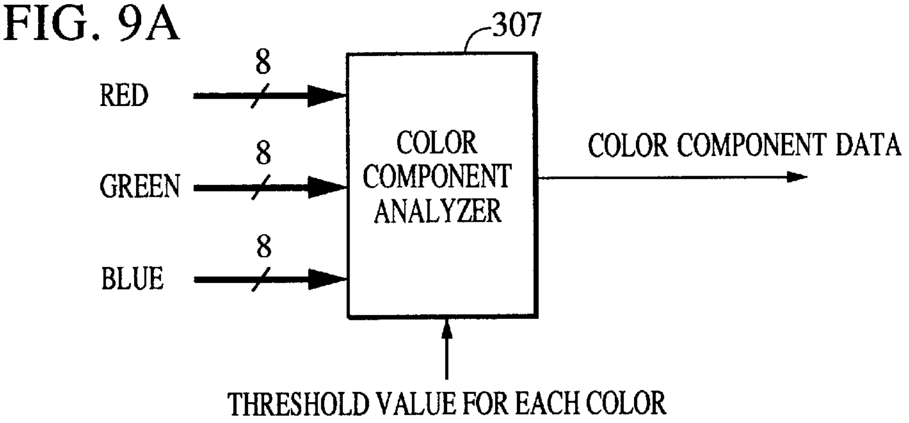
FIG. 9B
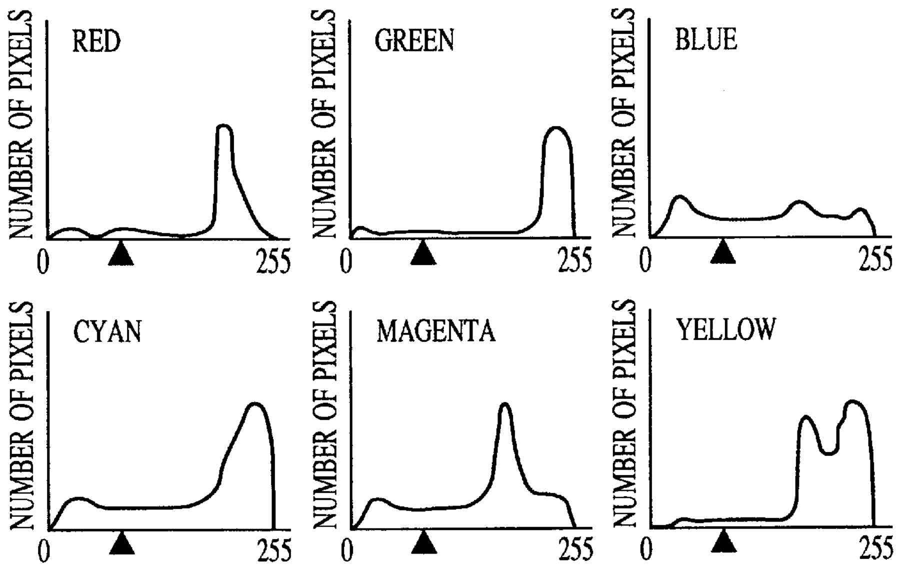
FIG. 9C
CYAN = ( GREEN + BLUE ) /2
MAGENTA = ( BLUE + RED ) /2
YELLOW = ( RED + GREEN ) /2
FIG. 9D
example >
RED = 12000
GREEN = 14000
BLUE = 4000
CYAN = 9000
MAGENTA = 8000
YELLOW = 13000

ORIGINAL IMAGE

RESULT OF DETERMINATION OF TEXT AREA

| | 0 | 90° | 180° | 270° |
|---|---|---|---|---|
| CHARACTER RECOGNITION RESULT | 売 | 版 | 花 | 服 |
| MEASURE OF SIMILARITY | 0.90 | 0.40 | 0.30 | 0.50 |

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

Since digital techniques today are extensively employed in photocopying machines, many of them perform multi-functions including not only a copying function but also other additional functions. Some photocopying machines work as a printer, a facsimile machine and even a filing machine. They may read and print filed data and file an image coming from a facsimile service.

Such advanced digital photocopying machines are widely accepted because a user can fax or file a document by simply placing the document on an automatic document feeder in the same way as he or she copies the document.

The digital photocopying machine is improved in its copying rate year by year and today reaches a rate of 20 to 80 sheets/minute. For this speed performance, many users prefer a digital photocopying machine rather than a conventional dedicated photocopying machine with a slow operational speed when many documents need copying, faxing or filing. The user needs to wait on standby in front of a machine to process a large quantity of documents until all documents are read, or the user needs to return to the machine to retrieve the documents when they are all processed.

When a large quantity of documents are processed, the orientation of all documents is not always aligned. Thus, the user needs to first align the orientation of the documents.

The operation of aligning the orientation of a plurality of documents before copying or faxing them on the digital photocopying machine is a troublesome job. Especially when the documents are of a sheet size A, handling them is easy if they are all in a portrait format. However, if portrait and landscape (A4R) formats are mixed, the alignment operation is open to two options of rightward alignment or leftward alignment. Although the A4 documents are typically loaded in a portrait alignment in a feeder in the photocopying machine, they are occasionally placed in a landscape alignment. The A4R (landscape aligned) documents are placed with their text aligned in a normal direction or in an inverted direction facing the port of the feeder. When holes are drilled on one margin of each document for binding purposes, the documents may be intentionally placed left side right.

FIG. 1 shows document orientations 102–109 when standard A4-size original documents are set in an automatic document feeder 101. As shown, a diversity of alignment settings are possible.

Because of a diversity of document settings, the alignment method of documents is also different from user to user.

With the documents not aligned, the photocopying machine delivers copy sheets having a diversity of alignments. If the number of copies increases, the user has to carry out a very tedious job for alignment. Some photocopying machines features an automatic stapling function. With the automatic stapling function enabled, the resulting copy sheets aligned in a diversity of directions are stapled as is.

Today, a reduction layout process today is available in which a plurality of documents are sequentially read, the read images are reduced, and the reduced images are laid out and printed on a single paper sheet.

When the documents are different in alignment, the alignment of the images of the documents, if subjected to the reduction layout process, are not consistent, and the resulting images are aesthetically unacceptable.

Document orientation determination techniques have been developed to free the user from an alignment operation of the documents and to rectify the difference in the setting of the documents from user to user. By integrating a sensor technique for sensing the orientation of the documents fed into a digital photocopying machine, the user is freed from the tedious job of aligning the documents.

Typically available as orientation determination techniques are a method of using a character recognition technique and a method of using a layout recognition technique. These techniques quickly perform the orientation determination process by checking part of the written content in an original document and outputting the result. In the method of using the character recognition technique, a text area of the original document is extracted, and characters in the text area are determined for the correction orientation.

The document orientation determination technique recognizes the feature of the text in the original document to recognize the orientation of the original document, and its performance level is not very high. The document orientation determination technique is subject to error. Since color documentation finds widespread use today, the document orientation determination technique has to work as well in color documentation.

Since the document orientation determination technique is conventionally used for black-and-white documents, an image is handled as a binary image of white and black levels in the document orientation determination process.

Many digital multi-purpose photocopying machines today, even if they are used for a black-and-white copying, incorporate a color CCD to read color images, since the function as a scanner is also important.

Since the orientation determination function is designed to work in the black-and-white original documents, color information, though available from the color CCD, remains unused in the orientation determination process. For this reason, the orientation determination occasionally fails to function properly on original documents.

(1) When the image of a two-color or three-color document, which is in widespread use today, is input with its text area blurred, the orientation of the document is not correctly determined, depending on the color, when its text area is blurred.

(2) The color text area most important in the determination of the orientation occasionally falls outside the area of interest in the orientation determination process.

(3) When a document with its text in one color and with its background in another color is handled, the orientation determination process fails to work properly.

SUMMARY OF THE INVENTION

It is an object of the present invention to provide an image processing apparatus and an image processing method for performing an orientation determination process of a color image with high accuracy.

Accordingly, in one aspect, the image processing apparatus of the present invention preferably comprises image input means for inputting the image of an original document as color image data, orientation determining means for determining the orientation of the original document based on the color image data that was input by the image input means, image editing means for performing a predetermined editing to the data corresponding to the color image data in accordance with the orientation determination result that was provided by the orientation determining means, and output means for outputting image data that was edited by the image editing means.

The orientation determining means preferably comprises color component analyzing means for analyzing the frequency of appearance of each of the color components based on the color image data and character recognition means for recognizing characters of the color image data in accordance with the analysis result provided by the color component analyzing means.

The orientation determining means preferably performs character recognition of each of the color components of the color image data in the order of the frequency of appearance of the color components and determines the orientation of the original document from the character recognition result.

The orientation determining means preferably performs character recognition of the image data of a color component having the highest frequency of appearance to determine the orientation of the original document when the number of color components is small.

The orientation determining means preferably performs character recognition of the color image data with a background color component removed from the original document to determine the orientation of the original document.

The image editing means preferably performs a reduction layout process of a plurality of original documents.

According to another aspect of the present invention, the image processing method comprises the input step of inputting the image of an original document as color image data, the orientation determining step of determining the orientation of the original document based on the color image data that was input through the input step, the image editing step of performing a predetermined editing to the color image data in accordance with the orientation determination result that was provided through the orientation determining step, and the output step of outputting image data that was edited through the image editing step.

The orientation determining step preferably comprises the color component analyzing step of analyzing the frequency of appearance of each of color components based on the color image data and the character recognition step of recognizing characters of the color image data in accordance with the analysis result that was provided through the color component analyzing step.

The orientation determining step preferably performs character recognition of each of the color components of the color image data in the order of the frequency of appearance of the color components and determines the orientation of the original document from the character recognition result.

The orientation determining step preferably performs character recognition of the image data of a color component having the highest frequency of appearance to determine the orientation of the original document when the number of color components is small.

The orientation determining step preferably performs character recognition of the color image data with a background color component removed from the original document to determine the orientation of the original document.

The image editing step preferably comprises a reduction layout process of a plurality of original documents.

According to yet another aspect of the present invention, a storage medium for storing computer-readable program codes for image processing preferably stores a code for the image input step of inputting the image of an original document as color image data, a code for the orientation determination step of determining the orientation of the original document based on the color image data input, a code for the image editing step of performing a predetermined editing to the color image data in accordance with the orientation determination result, and a code for the output step of outputting edited image data.

BRIEF DESCRIPTION OF THE DRAWINGS

FIGS. 9A–9D illustrate the process of a color component analyzer 307;

DESCRIPTION OF THE PREFERRED EMBODIMENTS

Figure 1:
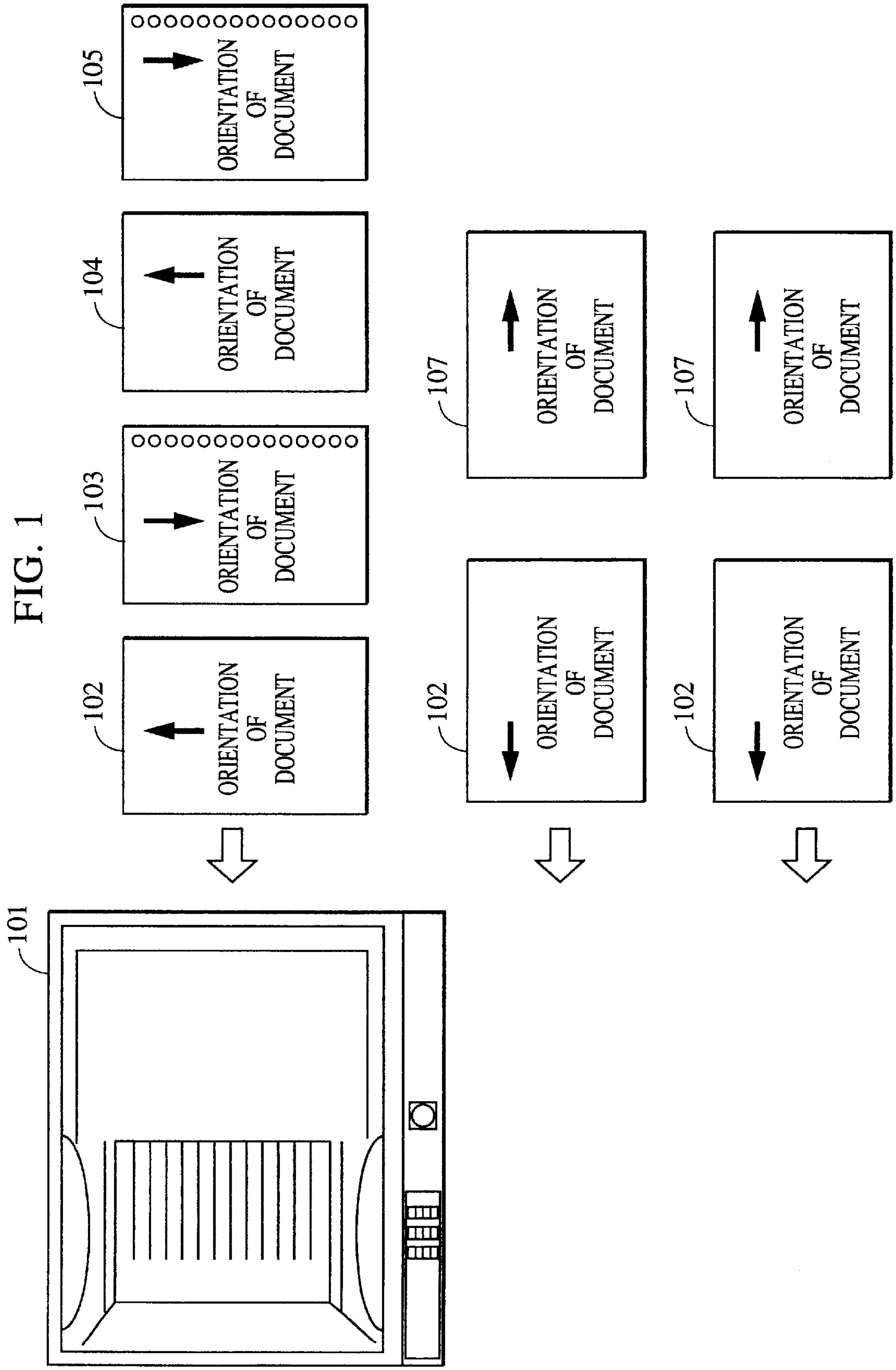
FIG. 1 shows the orientations 102–109 of an A4 sheet size document when it is set in an automatic document feeder 101.

Referring to the drawings, the embodiments of the present invention are discussed below.

The present invention will be discussed in connection with a digital multi-purpose photocopying machine. The present invention is not limited to the photocopying machine, and is implemented in a variety of other apparatuses.

Figure 2:
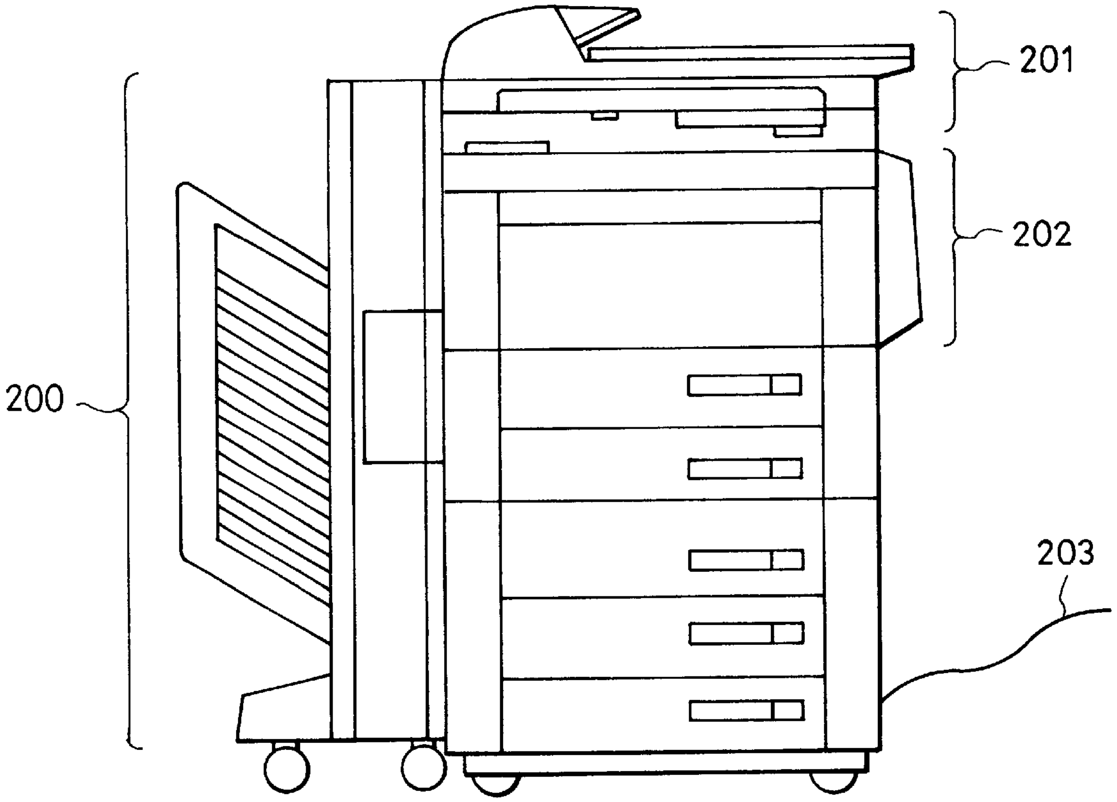
FIG. 2 shows the external appearance of a digital multipurpose photocopying machine of one embodiment of the present invention.

FIG. 2 shows the external appearance of the digital multi-purpose photocopying machine of one embodiment of the present invention. As shown, an image scanner 201 reads an original document and performs a digital signal processing. The image scanner 201 includes an automatic document feeder. The image scanner 201 is also provided with a color sensor for reading color information.

A printer module 202 prints on a paper sheet an image corresponding to an original image that is read by the image scanner 201. A telephone line 203 is used for facsimile communication with external apparatuses.

Figure 3:
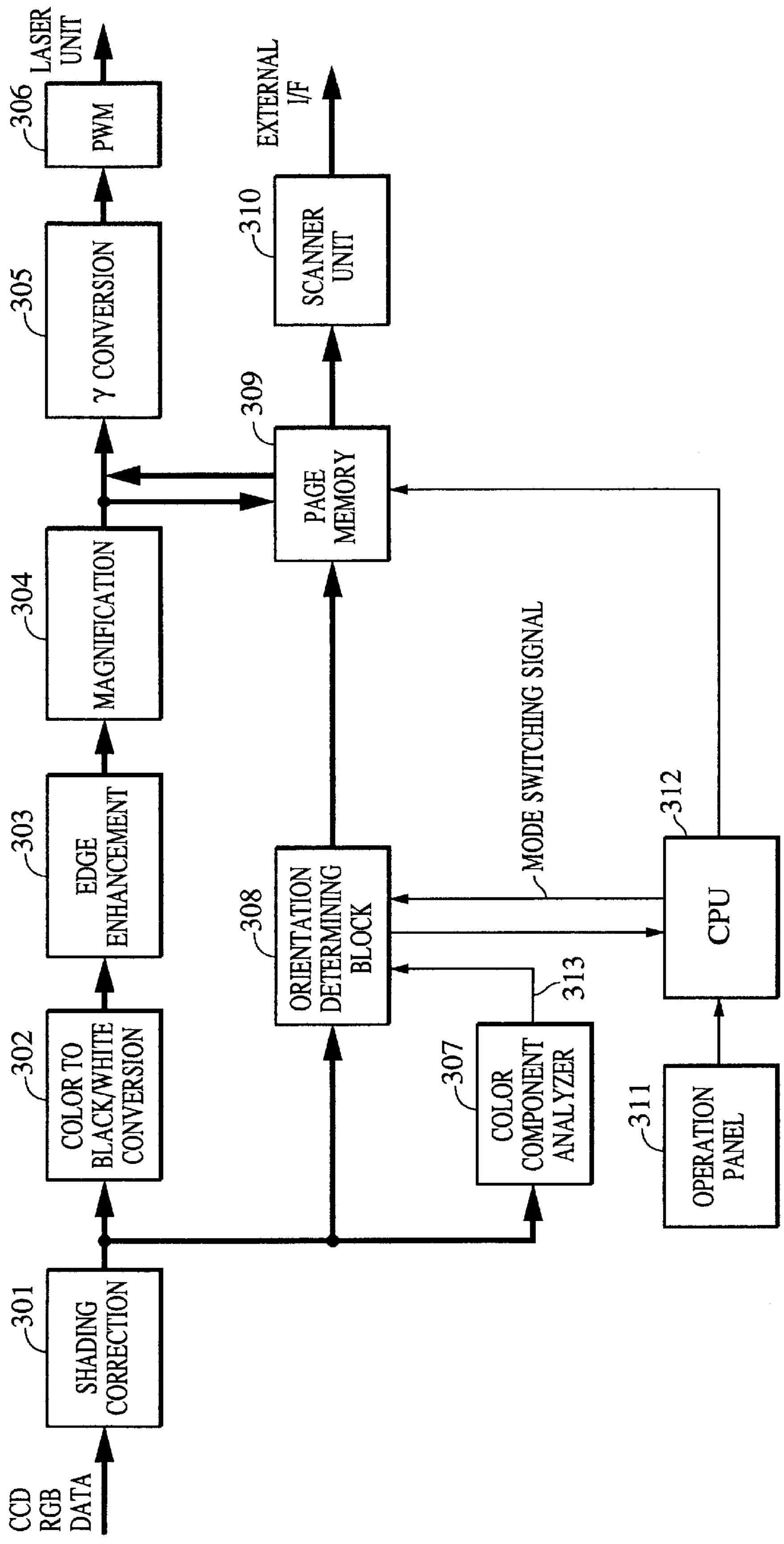
FIG. 3 is a block diagram showing the construction of the image processing system of the embodiment.

FIG. 3 is a block diagram showing the construction of an image processing system in this embodiment. As shown, a shading corrector 301 corrects variations in an electrical signal, between pixels, read by an unshown RGB color CCD. A color-to-black/white converter 302 converts RGB color image data into a black/white gray-scale image. Although a stricter method in which RGB luminance data is converted into lightness data is available, the use of G (green) data works without any problem. An edge enhancer 303 sharpens the edge of each character. For example, the edge of an image is enhanced by performing differentiation twice within a window of 5×5 pixels.

A magnifying circuit 304 reducer data for a reduced copying and interpolates data for an enlarged copying. When a both-side copying or a reduction layout copying is performed, image data is stored in a page memory to be described later. The image data is then read to copy the image as instructed from an operation panel while the address from which the image data read is being switched at the same time. A γ converter circuit 305 converts the image data as luminance data into density data which is output to the printer module. This data conversion is performed using a table. A pulse-width modulation (PWM) circuit 306 converts the image data, now in the form of the density data, into a signal indicative of the emission intensity of laser light, and outputs a pulse having a width corresponding to the density of the image data.

CPU 312 is the core for controlling the image processing. CPU 312 includes a ROM for storing a program and control data for the apparatus, a RAM for storing a work area and a variety of tables that are used when CPU executes the image processing, and related circuits. The operation panel 311 receives instructions from a user, and all instructions are entered through the operation panel 311. An instruction or command received through the operation panel 311 is sent to the CPU 312. A color component analyzer 307 in this embodiment analyzes what quantity of pixels is present for one color relative to those for other colors in the RGB color data.

An orientation determining block 308 determines the orientation of an original document by referencing an analysis result 313 input by the color component analyzer 307 and by analyzing the image data that was shading-corrected by the shading corrector 301. More specifically, based on the analysis result 313 analyzed by the color component analyzer 307, the orientation determining block 308 detects a background color considering which color is dominant over the other colors and does not use the dominant color component in the determination process.

A page memory 309 stores the input image data. In this embodiment, the image data is input on a real-time basis. The orientation determining block 308 inputs the image data corresponding to one document page while immediately notifying CPU 312 of the orientation determination result. In response to the orientation determination result, CPU 312 controls the order of reading from the page memory 309. During a copying operation, the image data is read from the page memory 309, and is sent to the γ converter circuit 305. A scanner unit 310 outputs, to an external apparatus, image data read during a scanning operation.

When the operation panel 311 selects the orientation determination process and the reduction layout process in the above arrangement, CPU 312 sets the execution of the determination process in the orientation determining block 308. The image processing system receives the RGB electrical signal from the CCD and corrects it in the shading corrector 301. The RGB data is converted into black/white data through the color-to-black/white converter 302 when the destination of the data is a black/white printer. This is because no color data is required in a printing in the black/white printer. When a color scanner inputting is instructed, the data passes through the converter 302 without any processing step added on it. The edge enhancer 303 sharpens the edge of the image (only when selected and instructed), and the edge enhanced image is input to the magnifying circuit 304.

The shading-processed image data is also sent to the color component analyzer 307. The color component analyzer 307 analyzes color components while receiving the image data. The color component analyzer 307 binarizes the RGB multi-level image data at a threshold and sums resulting binary data on a color-by-color basis. More specifically, the color component analyzer 307 sums the binary data in each of the colors of R (red), G (green), B (blue), C (cyan), M (magenta) and Y (yellow) in the entire image area, and sends the results to the orientation determining block 308. The color component analyzer 307 will be discussed more in detail later.

The orientation determining block 308 sequentially receives the image data and extracts a text area while storing the image data in the text area. Upon completing the text area extraction, the orientation determining block 308 performs the orientation determination process in the text area of a color image in the order of priority based on the analysis result 313 of the color component analyzer 307. The orientation determining block 308 sends the orientation determination results to the CPU 312.

The image data that was subjected to the reduction process in the magnifying circuit 304 is temporarily stored in the page memory 309. The page memory 309 stores the image data of a number of sheets. Based on the orientation determination results, an image not in a regular direction is subjected to a rotation process (by changing the manner of reading sequence) and the data of one page is then stored in the page memory 309. In a copying operation, the image data is converted into data compatible with printer characteristics through the y converter circuit 305 and is output to a laser printer unit through the PWM circuit 306.

Figure 4:
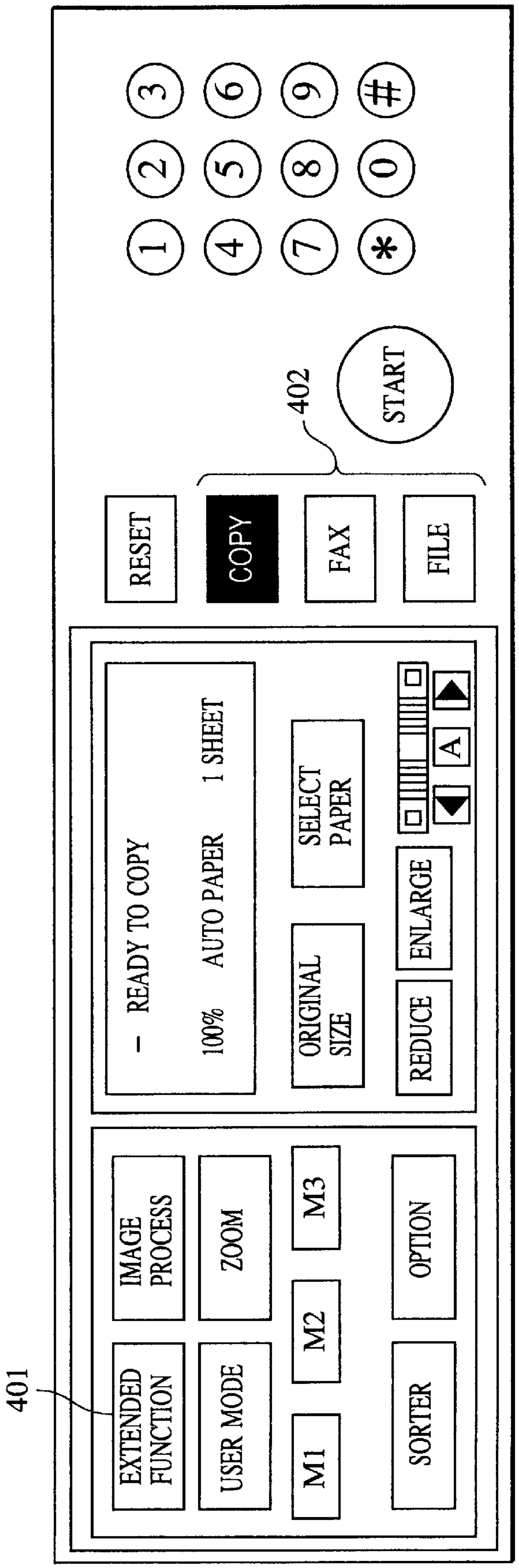
FIG. 4 shows the external appearance of an operation panel 311 of the embodiment of the present invention.
Figure 5A:
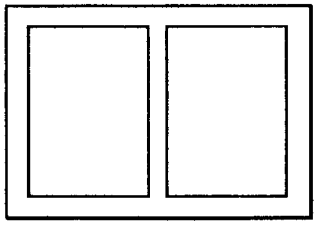
FIGS. 5A–5H shows reduction layouts in which a plurality of reduced documents are arranged.
Figure 5B:
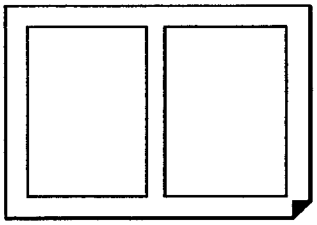
Figure 5C:
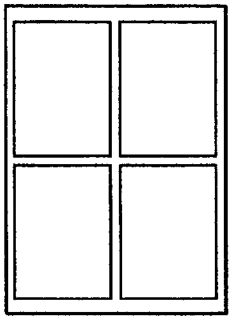
Figure 5D:
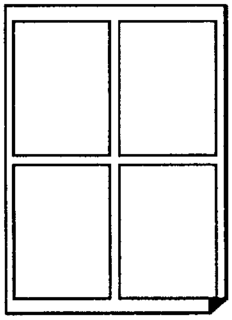
Figure 5E:
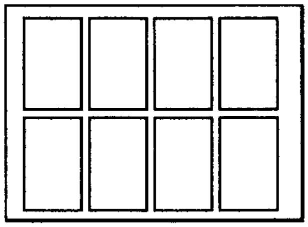
Figure 5F:
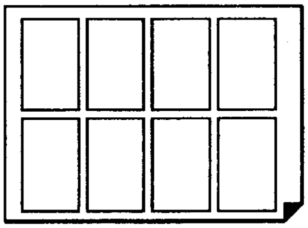
Figure 5G:
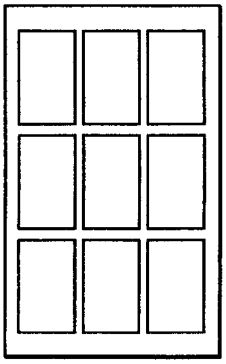
Figure 5H:
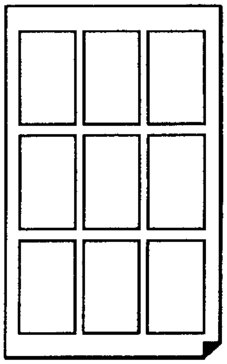

FIG. 4 shows the external appearance of the operation panel 311 of this embodiment. In the copying operation, an extended function key 401 has a mode selection function to perform a reduction layout, turn on and off the automatic document orientation sensing, and to select a color document. The user selects the reduction layout through the extended function key 401 in the copying operation.

The reduction layout copying is now discussed. FIGS. 5A, 5C, 5E and 5G show one-side, reduction layout copying, and FIGS. 5B, 5D, 5F and 5H show both-side, reduction layout copying. The both-side copying function is widely used because it saves paper consumption with the resulting volume of documents being less bulky.

Figure 6:
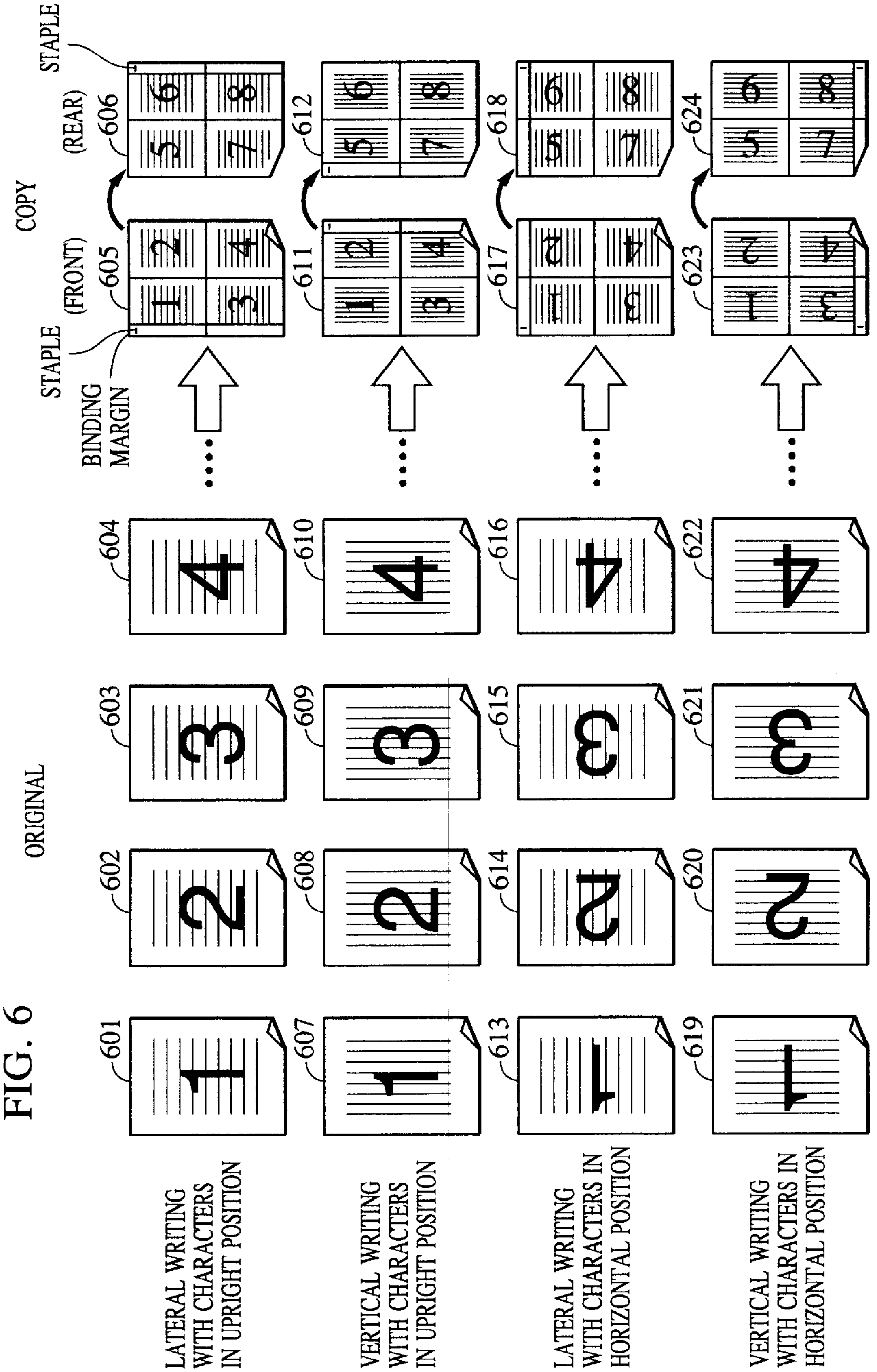
FIG. 6 shows 4-in-1 both-side reduction layout examples.

In the reduction layout, any documents are automatically reduced regardless of the content of the documents. FIG. 6 shows examples of 4-in-1 both-side, reduction layout. As shown, a text, if in Japanese, takes a lateral writing or a vertical writing with a document sheet arranged in a portrait or landscape position. More specifically, documents 601–604 of the lateral writing with characters in the upright position are reduced into layouts 605 and 606, documents 607–610 of the vertical writing with characters in the upright position are reduced into layouts 611 and 612, documents 613–616 of the lateral writing with characters in the horizontal position are reduced into layouts 617 and 618, and documents 619–622 of the vertical writing with characters in the horizontal position are reduced into layouts 623 and 624.

As seen from FIG. 6, the copy of the actual reduction layout is not one satisfactory to the user.

Figure 7:
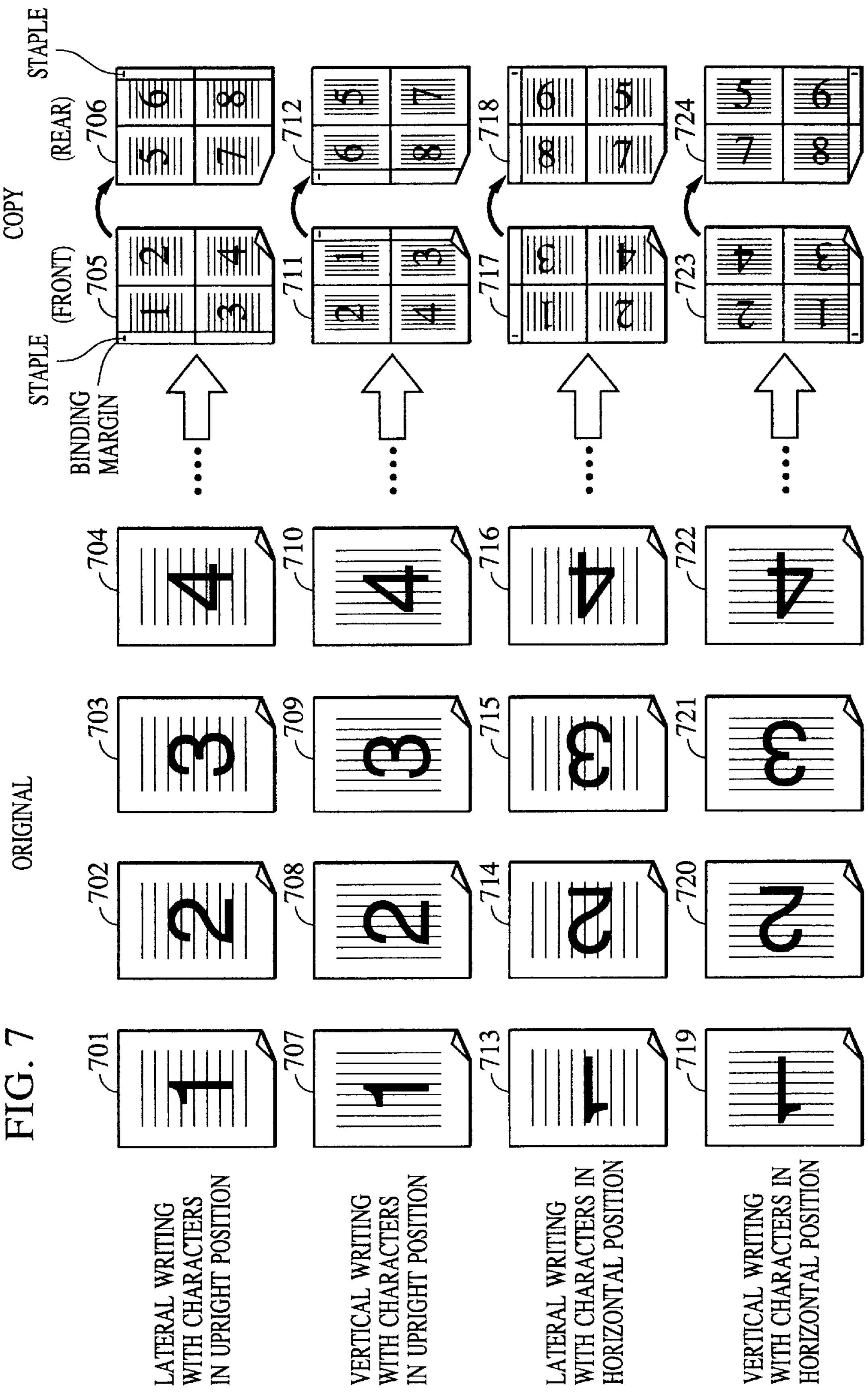
FIG. 7 shows the reduction layouts in the embodiment of the present invention.

FIG. 7 shows the reduction layout provided by this embodiment. As shown, the layout is properly set in consideration of the alignment of each text. More specifically, documents 701–704 of the lateral writing with characters in the upright position are reduced into layouts 705 and 706, documents 707–710 of the vertical writing with characters in the upright position are reduced into layouts 711 and 712, documents 713–716 of the lateral writing with characters in the horizontal position are reduced into layouts 717 and 718, and documents 719–722 of the vertical writing with characters in the horizontal position are reduced into layouts 723 and 724.

To achieve the proper document arrangement in the reduction layout, the document orientation is sensed.

Figure 8:
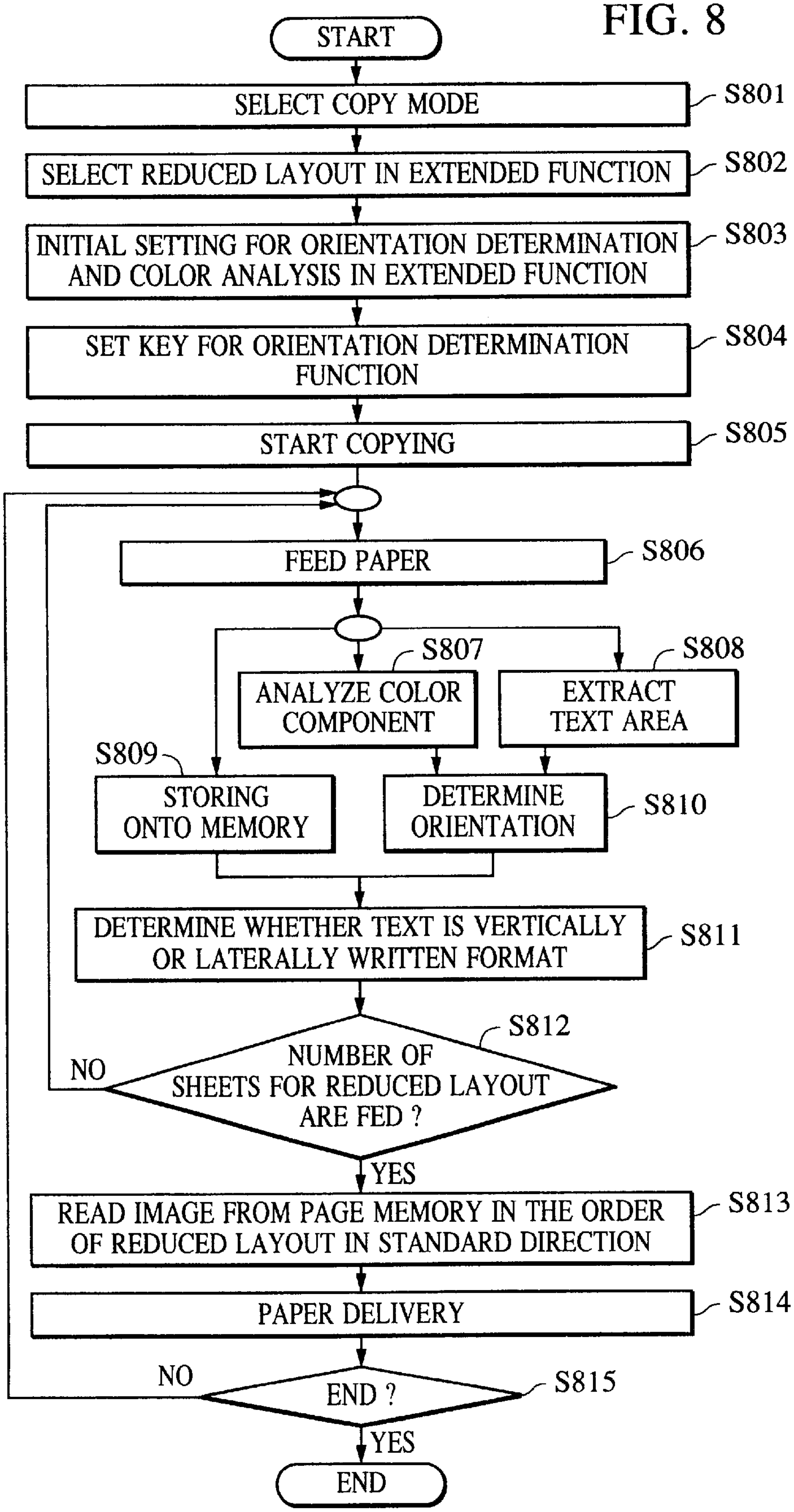
FIG. 8 is a flow diagram showing the reduction layout process in the embodiment of the present invention.

The operation of the reduction layout is now discussed. FIG. 8 is a flow diagram showing the reduction layout process in this embodiment.

In step S801, an operation mode (copying/faxing/filing) selection key 402 in the operation panel 311 shown in FIG. 4 is pressed to select a copying operation. In step S802, the extended function key 401 is pressed to select a reduction layout. Specifically, when the extended function key 401 is pressed, a display mode is changed to a reduction layout display screen as shown in FIGS. 5A–5H, and a desired layout is selected from the display screen.

In step S803, an orientation determination function is set in an initial setting. Whether or not the color component analysis is performed is also selected in this setting. In step S804, the key for selecting the orientation determination function is pressed. The setting of "document orientation sensing ON, color component analysis ON and copying" selects a color component analysis and orientation determination mode. In step S805, a copy start key is pressed to start a copying operation. In step S806, documents are placed on a document platen. The reader mechanism of the photocopying machine moves to start reading an image.

In step S809, the image processing described above is performed on the read image data, while the read image data is temporarily stored in the page memory 309. In step S807, the color component analyzer 307 analyzes the color pixels in response to the image. The text area is extracted on a color-by-color basis in step S808. In step S810, the analysis result for one page is sent to the orientation determining block 308, which then determines the document orientation.

In step S811, the orientation determination result is stored page by page, and it is determined if the number of document sheets specified, for example, 4 document sheets in a 4-in-1 layout are fed in the reduction layout. When the image data is fully input, the process goes to step S813, where the image is read in the order of regular reduction layout to be printed. The resulting copy sheet is delivered in step S814, and it is determined in step S815 if all steps are completed. The above steps are repeated until all steps are completed.

When an image is input to the orientation determination means in the digital photocopying machine or scanner device in this embodiment, the RGB color images, rather than a black/white image in the conventional method, is input. The image RGB data input on a color-by-color basis is subjected to the following processes.

(1) In each color image, color data is binarized at a threshold. The image data is summed on a color-by-color basis.

For example, the number of color pixels are counted for each of the colors of red, blue, green, cyan, magenta and yellow. The number of pixels for the respective colors, namely, the frequency of color components, are sent to the orientation determining block in the order of high to low numbers.

(2) Text area extraction means performing a preprocess prior to the orientation determination process extracts the text areas in the images on a color-by-color basis.

(3) In response to the color component analysis result, the orientation determining block performs the orientation determination process based on the color text area information. The color component analysis result serves as information that determines the priority of the text area to be sampled. In the handling of the color component information, the most frequently used color image may be raised in priority. Considering that the color image for the background employs a dominantly large amount of pixels, that color may be excluded from the determination process.

According to this embodiment, the color information is used in the document orientation determination process. The orientation of a color document is determined at a high-accuracy level.

Each block is now discussed in detail. Several methods are available for the document orientation determination. On the basis that the alignment of characters plays an important role in the determination of the document orientation, the method of determining the orientation of the original document by determining the alignment of the characters is discussed.

The original document is typically a mixture of a text, produced by a word processor, drawings, tables and pictures. In such a case, the text areas are determined using part of character recognition technique.

Color Component Analysis Process

FIGS. 9A–9D illustrate the process taken by the color component analyzer 307. The color component analyzer 307 binarizes the multi-level image data input by the RGB color sensor. For example, when the color component analyzer 307 binarizes the image data from a red color sensor having a value of "130" at a threshold of "50", a "1" is obtained. The number of "1s" of the image from the red color sensor is summed by line and by page. If the red color appears frequently, the sum increases. The same process is carried out for the green and blue colors.

FIG. 9B shows histograms of the appearance of the colors. A symbol "▲" represents a threshold. As understood from FIG. 9B, if a pixel value is greater than the threshold, it is considered large. As a method of extracting the cyan color component, the image data of a green sensor and the image data of the blue sensor are averaged and treated as the image of the cyan color. In the same way, the image data of the magenta and yellow colors are obtained. FIG. 9C shows equations to determine CMY color components.

In this way, the red, blue, cyan, magenta and yellow pixels are summed by line and by page on a color-by-color basis. FIG. 9D shows an example of the numbers of pixels for the colors. In this example, the number of green pixels per page is the largest, followed by the number of yellow pixels. These numbers are important in determination process. The following process steps are taken.

(1) The orientation of the document is determined referring to the text area of the color pixels having the largest number. In this case, the color pixels are prioritized according to the frequency of their appearance.

(2) The background color is neglected. If the color pixels for one color has the predominantly largest number with a large number difference from the color pixels of the second largest number, the color of the largest number pixels is treated as the background color. In the subsequent orientation determination process, the text of the color pixels having the second largest number or smaller is used.

Specifically, the determination result of the color pixel numbers is subsequently used by the orientation determining block 308 as the color analysis result.

The color component analyzer 307 may perform the processings for the colors in parallel to keep pace with the pipeline process taken by the image processing system. The predetermined threshold may be set on a color-by-color basis. Making this parameter variable, the threshold for binarizing is modified. This allows variations in the sensors to be corrected and a particular color to be intentionally enhanced.

Character Alignment Determination Preprocess

A character alignment determination preprocess is performed sequentially or in parallel (concurrently) on a color-by-color basis.

[Binarizing Process]

This process is a preprocess prior to the orientation determination process. The image data input here is multilevel data. The purpose of the binarizing process is to extract the text area from the image. A simple binarizing process serves this purpose well. In such a simple method, a medium value of "128" is used as a threshold.

When the original document has a background color or a relatively light density, a resulting binarized image may not be appropriate for the subsequent processes. In such a case, a binarizing process using a dynamic threshold level is available.

In this binarizing process, the threshold is determined based on the luminance of the pixel column prior to a pixel of interest, or the average of density data and luminance or density of a pixel of interest, and the image data is binarized using the resulting threshold.

In another method, the image processing system receives binary data rather than receiving the multilevel image data. Such a method is acceptable as long as the image data suits the subsequent processes.

[Text Area Extraction Process]

In the orientation determination process, the text area is detected from the image data. This is because the algorithm in this embodiment uses the characters as means for determining the orientation of the document.

Color pixels are detected from the image data color by color. When an area satisfies certain conditions, that area is determined as a text area, and the resulting area information is stored.

The certain conditions are listed as follows:

(1) The area has a continuous edge constructed of color pixels.

(2) The area has a constant width constructed of color pixels.

(3) There exist nearby color pixel blocks in the area.

An area that satisfies the above conditions is determined as a text area. Although these conditions alone are not all used to perform an accurate determination, further discussion about them is not provided here.

Figure 10A:
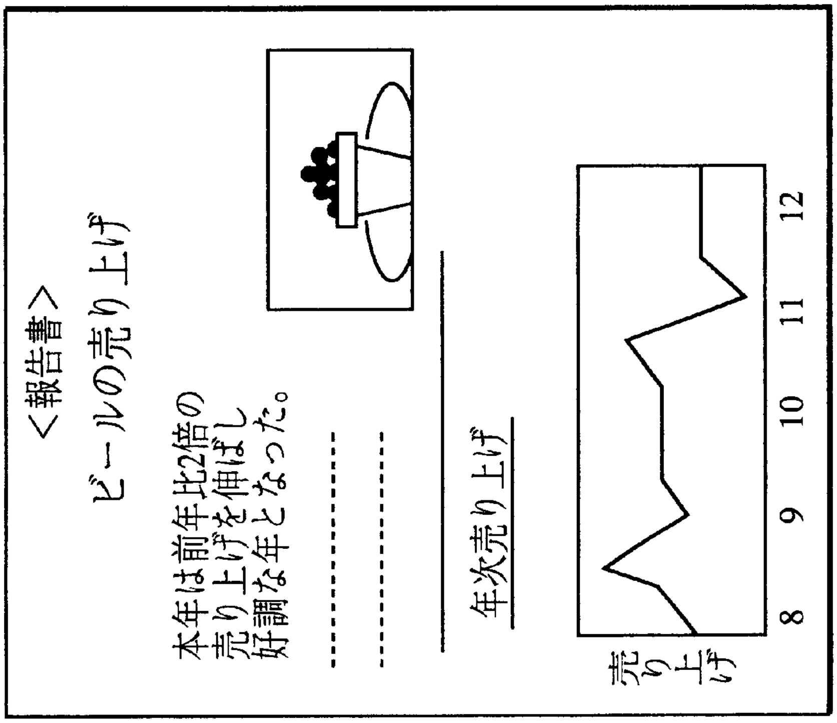
FIGS. 10A–10B show the determination result of a text area from an original image.
Figure 10B:
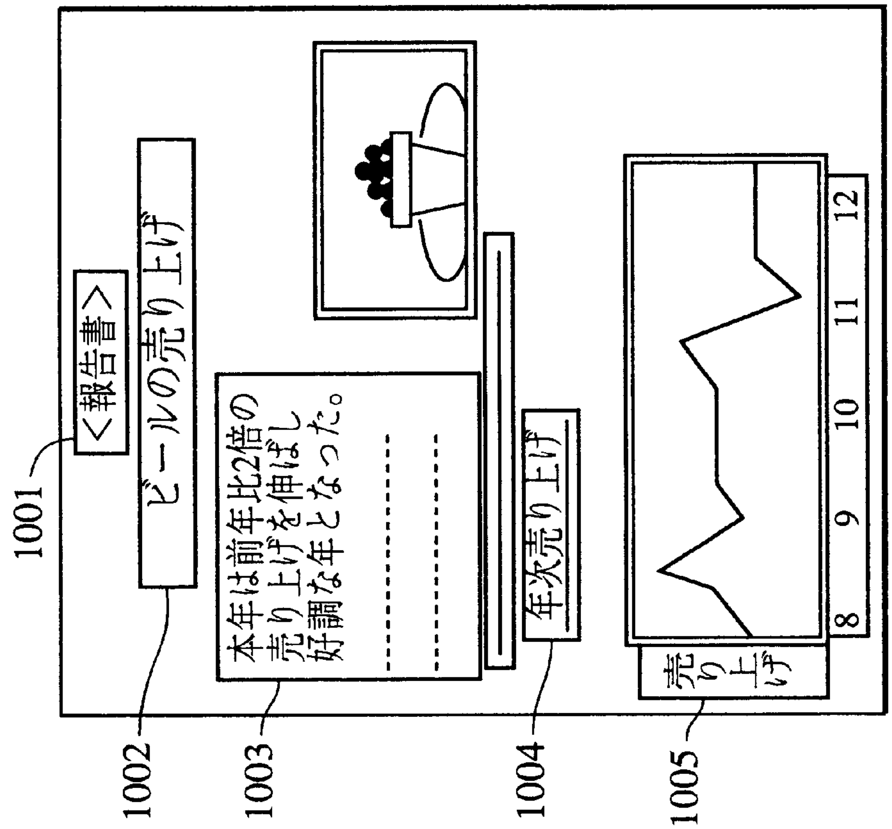

FIGS. 10A and 10B show the original image and the result of the text area determination. FIG. 10A shows the original image, in which text areas, a picture and a graph are included. FIG. 10B shows text areas extracted from the original image, namely, 1001–1005 extracted from the original image.

The text area 1002 contains relatively large character blocks, and the text area 1003 is the widest with the largest number of characters contained therewithin. The text block 1005 is vertically written.

[Character Recognition]

Figure 11A:
FIGS. 11A–11*c* illustrate a character recognition process.
Figure 11B:
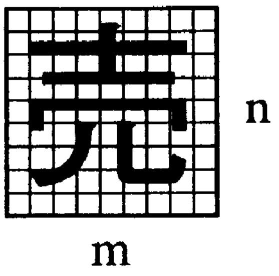

The extracted text area is subjected to the character recognition process. Available as the character recognition methods are a feature vector extraction method, a comparison method and the like. For example, as shown in FIG. 11A, the text area containing a character "売" is subjected to character recognition, and the characters in this text area are extracted in a first step. In this step, a rectangle for one character is picked up by detecting continuous color pixels. As shown in FIG. 11B, a single character is then extracted as a pixel block of m×n (64×64 pixels) in a second step. Using a window of 2×2 pixels out of the pixel block, the direction of the distribution of the color pixels (direction vector information) is then extracted as shown in FIG. 11C.

Figure 11C:
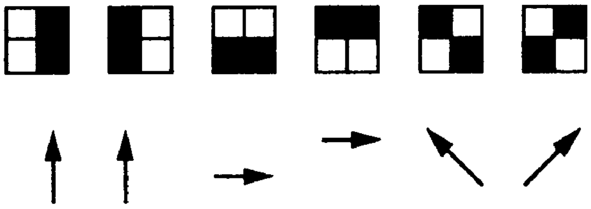

FIG. 11C shows part of the direction vector information. With the 2×2 pixel window shifted, the feature of the character is obtained by acquiring a significant number of pieces of direction vector information. These feature vectors are compared with the content of a character recognition dictionary stored beforehand, and characters are then extracted in the closeness order of the feature vectors. In this case, a first candidate, a second candidate, a third candidate, . . . in the order of feature vector closeness. The feature closeness of these feature vectors are a distance to the observed character, namely, a measure of similarity (match).

[Orientation Determination Process]

Figure 12A:
FIGS. 12A–12C illustrate a character orientation determination process.
Figure 12B:
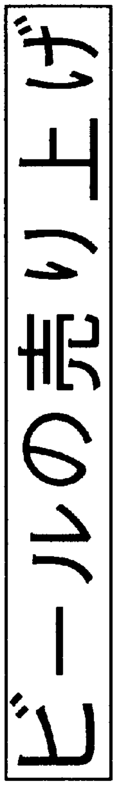
Figure 12C:
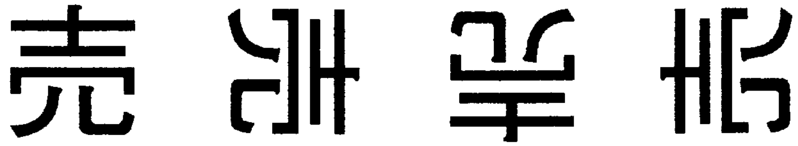

The measure of similarity in the character recognition is thus obtained. The character alignment determination process based on the measure of similarity is now discussed. FIGS. 12A–12C illustrate the character alignment determination process, and in this example, a Japanese phrase "ビールの売り上げ" (sales report of beers) is used.

FIG. 12A shows a string of characters of the phrase in a standard alignment. FIG. 12B shows the character strings rotated by 270° from FIG. 12A. Now focusing on the character "売", it is subjected to the character recognition from four directions of 0°, 90°, 180°, and 270° as shown in FIG. 12C. The angle of rotation is changed by modifying the manner of reading the feature vectors, and rotating the original document is not necessary.

The character recognition result is different from rotation angle to rotation angle as shown in FIG. 12C. FIG. 12C also lists the results of character recognition and their measures of similarity for illustration purposes only, and the actual system does not necessarily provide the same results.

In FIG. 12C, the character recognition is made at a standard direction (0°), the character "売" is correctly recognized with a high measure of similarity of 0.90. When the character recognition is made at a direction 90° shifted, the character is erroneously recognized as "版" with a measure of similarity as low as 0.40. An erroneous recognition takes place with a measure of similarity lowered because the character recognition is performed based on the feature vectors in directions rotated. In the same manner, when the character recognition is performed at angles of rotation of 180° and 270°, erroneous recognitions take place with measures of similarity lowered. The more complex the character, the greater the differences in the measure of similarity with the direction of the character recognition changed.

Since the measure of similarity is the highest at the standard direction in the results shown in FIG. 12C, it is highly likely that the original document is aligned in the standard direction. To increase the character alignment determination accuracy, a plurality of characters within the same text area are recognized from four directions in the same way as above. When the character alignment is determined in a single block only, a special character string may be picked up with an erroneous result. For this reason, a plurality of text blocks are subjected to the character recognition process.

The measures of similarity of the characters of interest are averaged in each of the four directions in the blocks, and the averages of the characters of interest in each of the four directions in text areas are averaged. The direction resulting in the highest final average is determined to be the alignment or orientation of characters (document).

Rather than determining the alignment based on the measure of similarity of a single character, the alignment of the character is determined referring to not only the measure of similarity of a plurality of characters within the same text area but also the measure of similarity of a plurality of characters within another text area. A high-accuracy orientation determination of the characters (document) is thus possible. The orientation determination is also possible by referring to the measures of similarity of a single character in a text area or the measures of similarity of a plurality of characters within the same text area.

In this way, the document orientation determination is performed. The characters within a document are varied in form. Some characters may be decorated initials. A drawing may be mistaken for a character. For this reason, the orientation determination process is preferably performed in more areas to result in a high-accuracy determination.

One example of the document orientation recognition has been discussed. Other recognition methods are also available. Any recognition method is acceptable.

Since the orientation determining block comprises a CPU having dedicated hardware, the processing system may be easily modified by instructions.

FIGS. 9A–9D show the color component analysis for one page. A color component analysis result for several lines in a particular block in the document may be output and the priority for sampling is changed per several lines.

The present invention may be implemented in a system constructed of a plurality of apparatuses (including a host computer, interface units, a reader and a printer) or may be implemented in a standalone apparatus (such as a photocopying machine or a facsimile machine).

The storage medium holding a program code of software for carrying out the functions of the embodiments is loaded in a system or apparatus. The computer (CPU or MPU) of the system or apparatus reads the program code stored in the storage medium to execute the program. The objects of the present invention are thus achieved.

The program code read from the storage medium performs the novel functions of the present invention, and the storage medium storing the program code constituting the present invention.

Available as storage media for feeding the program code are a floppy disk, a hard disk, an optical disk, a magneto-optic disk, a CD-ROM, a CD-R, a magnetic tape, a non-volatile memory card a, ROM and the like.

By executing the program code read by the computer, the functions of the embodiments are performed. Furthermore, the OS (operating system) running on the computer partly or entirely performs an actual process according to the instruction of the program code, and the functions of the embodiments are thus performed.

The program code from the storage medium is read into a memory incorporated in a feature expansion board in the computer or in a feature expansion unit connected to the computer. The CPU mounted feature expansion board or the feature expansion unit partly or entirely performs the actual process in response to the instruction from the program code. The functions of the above embodiment are executed through the process.

As described above, the orientation of the color image is determined and the editing is performed on the data corresponding to the color image data in accordance with the determination results. When N document sheets are edited in an N-in-1 layout, for example, the user is freed from arranging the documents in consideration of the orientations of the documents. An easy-to-see N-in-1 image is thus formed.

Since the orientation determination is performed based on the color component analysis result and the character recognition result, an orientation determination works in the editing processing for documents containing characters.

Since the character recognition is performed in the order of frequency of appearance of the color components, the orientation determination is performed with a priority placed on the largest number of color characters.

The character recognition and orientation determination are carried out without any effect from the background color.

What is claimed is:

1. An image processing apparatus comprising:

image input means for inputting an image of an original document as color image data;

orientation determining means for determining an orientation of the original document based on the color image data input by said image input means;

image editing means for performing a predetermined editing of data corresponding to the color image data in accordance with an orientation determination result provided by said orientation determining means; and output means for outputting image data edited by said image editing means, wherein said orientation determining means comprises color component analyzing means for analyzing a frequency of appearance of each of color components based on the color image data and character recognition means for recognizing characters of the color image data in accordance with an analysis result provided by said color component analyzing means.

2. An image processing apparatus according to claim 1, wherein said orientation determining means performs character recognition of each of the color components of the color image data in an order of the frequency of appearance of the color components and determines the orientation of the original document from a character recognition result.

3. An image processing apparatus according to claim 1, wherein said orientation determining means performs character recognition of the image data of a color component having a highest frequency of appearance to determine the orientation of the original document when a number of the color components is small.

4. An image processing apparatus according to claim 1, wherein said orientation determining means performs character recognition of the color image data with a background color component removed from the original document to determine the orientation of the original document.

5. An image processing apparatus according to claim 1, wherein said image editing means performs a reduction layout process on a plurality of original documents.

6. An image processing method comprising:

an input step of inputting an image of an original document as color image data;

an orientation determining step of determining an orientation of the original document based on the color image data input by said input step;

an image editing step of performing a predetermined editing of the color image data in accordance with an orientation determination result provided by said orientation determining step; and an output step of outputting image data edited by said image editing step, wherein said orientation determining step comprises a color component analyzing step of analyzing a frequency of appearance of each of color components based on the color image data, and a character recognition step of recognizing characters of the color image data in accordance with an analysis result provided by said color component analyzing step.

7. An image processing method according to claim 6, wherein said orientation determining step performs character recognition of each of the color components of the color image data in an order of the frequency of appearance of the color components and determines the orientation of the original document from a character recognition result.

8. An image processing method according to claim 6, wherein said orientation determining step performs character recognition of the image data of a color component having a highest frequency of appearance to determine the orientation of the original document when a number of the color components is small.

9. An image processing method according to claim 6, wherein said orientation determining step performs character recognition of the color image data with a background color component removed from the original document to determine the orientation of the original document.

10. An image processing method according to claim 6, wherein said image editing step comprises a reduction layout process on a plurality of original documents.

11. A storage medium for storing computer-readable program codes for image processing, said medium storing:

a code for an image input step of inputting an image of an original document as color image data;

a code for an orientation determination step of determining an orientation of the original document based on the input color image data;

a code for an image editing step of performing a predetermined editing of the color image data in accordance with an orientation determination result; and a code for an output step of outputting edited image data, wherein said code for the orientation determining step comprises a code for a color component analyzing step of analyzing a frequency of appearance of each of color components based on the color image data, and code for a character recognition step of recognizing characters of the color image data in accordance with an analysis result provided by said code for the color component analyzing step.

12. An image processing apparatus comprising:

image input means for inputting an image of an original document as color image data; and orientation determining means for determining an orientation of the original document based on the color image data input by said image input means, wherein said orientation determining means comprises color component analyzing means for analyzing a frequency of appearance of each of color components based on the color image data, and character recognition means for recognizing characters of the color image data in accordance with an analysis result provided by said color component analyzing means.

* * * * *

UNITED STATES PATENT AND TRADEMARK OFFICE

CERTIFICATE OF CORRECTION

PATENT NO. : 6,295,385 B1
DATED : September 25, 2001
INVENTOR(S) : Makoto Takaoka et al.

It is certified that error appears in the above-identified patent and that said Letters Patent is hereby corrected as shown below:

Column 1,
Line 66, "today" should be deleted.

Column 4,
Line 25, "shows" should read -- show --.

Column 5,
Line 9, "reducer" should read -- reduces --.

Column 6,
Line 36, "y" should read -- $\gamma$ --.

Column 10,
Line 54, "differences" should read -- difference --.

Column 11,
Line 51, "card a," should read -- card, a --.

Signed and Sealed this

Twenty-sixth Day of March, 2002

*Attest:*

JAMES E. ROGAN

*Attesting Officer*

*Director of the United States Patent and Trademark Office*